United States Patent [19]

Barabas

[11] 4,116,913

[45] Sep. 26, 1978

[54] GELLING AGENT OF WATER MISCIBLE ORGANIC LIQUIDS

[75] Inventor: Eugene S. Barabas, Watchung, N.J.

[73] Assignee: GAF Corporation, New York, N.Y.

[21] Appl. No.: 790,922

[22] Filed: Apr. 26, 1977

[51] Int. Cl.$^2$ ............................................. C08L 35/00
[52] U.S. Cl. .................... 260/29.6 E; 260/29.6 H;
260/29.6 N; 260/30.2; 260/30.4 R; 260/32.8 R;
260/33.2 R; 260/33.4 R; 526/321; 526/325
[58] Field of Search ................. 260/29.6 H, 29.6 E,
260/29.6 N, 30.2, 30.4 R, 32.8 R, 33.2 R, 33.4
R; 526/321, 325

[56] References Cited

U.S. PATENT DOCUMENTS

| | | | |
|---|---|---|---|
| 2,637,712 | 5/1953 | Upton | 260/29.6 H |
| 2,640,039 | 5/1953 | Williams | 260/29.6 H |
| 2,643,245 | 6/1953 | Wilson | 526/325 |
| 2,643,246 | 6/1953 | Wilson | 526/325 |
| 2,806,020 | 9/1957 | Scott et al. | 260/29.6 H |
| 3,345,289 | 10/1967 | Freifeld et al. | 260/29.6 H |
| 3,436,378 | 4/1969 | Azorlosa et al. | 260/29.6 H |
| 3,554,287 | 1/1971 | Eilers et al. | 260/29.6 H |

*Primary Examiner*—Eugene C. Rzucidlo
*Attorney, Agent, or Firm*—Walter C. Kehm; Walter Katz

[57] ABSTRACT

Thickener compositions comprising an emulsion copolymer of vinylacetate monomer and a monoester of an unsaturated dicarboxylic acid monomer, such as the monoester of maleic acid, and a water-miscible organic liquid, are described herein.

14 Claims, No Drawings

GELLING AGENT OF WATER MISCIBLE ORGANIC LIQUIDS

BACKGROUND OF THE DISCLOSURE

1. Field of the Invention

This invention relates to emulsion copolymers useful as thickening or gelling agents for water-miscible organic liquids, and, more particularly, to a thicknening compositions comprising an emulsion copolymer of vinylacetate and a monoester of an unsaturated dicarboxylic acid and a water-miscible organic liquid.

2. Description of the Prior Art

The preparation of gels by the addition of natural or synthetic compounds to water or organic liquids is well known in the art. For example, U.S. Pat. No. 2,773,811 describes the preparation of aqueous gels by the use of natural and synthetic gums. U.S. Pat. No. 3,101,300 teaches the formation of an oil-water gel by the addition of acid-alkanolamide and an aliphatic polyglycolether phosphate. In Brit. Pat. No. 961,478, a non-thixotropic fuel gel is prepared by using the combination of an acid-functional polyelectrolyte and polyallylsucrose. Several other patents describe similar gelled systems using various gelling agents. However, the formation of these gels necessitates polymers with crosslinked structures which prevent the movement of the liquid. The gelation in the prior art is brought about by the swelling of the polymer as a consequence of the penetration of the liquid through the polymeric network, and therefore, the nature of the gel depends upon the affinity between the polymer and the liquid, wherein it can be either hydrophilic or hydrophobic.

SUMMARY OF THE INVENTION

What is described herein are thickener compositions comprising an emulsion copolymer of vinylacetate monomer and a monoester of an unsaturated dicarboxylic acid monomer, and a water-miscible organic liquid.

DESCRIPTION OF THE PREFERRED EMBODIMENTS

In accordance with the present invention, it has been discovered that certain copolymers are able to thicken or gel a group of organic liquids whose characteristic property is their miscibility with water. Liquids which belong to this class include: alcohols (e.g. methanol, ethanol, isopropanol, etc.); ketones (e.g. acetone, MEK, etc.); aldehydes (e.g. acetaldehyde), lactones (e.g. butynolactone, β-propiolactone, etc.); amides (e.g. dimethylformamide, dimethylacetamide); alcoholethers (e.g. methylcellosolve, methylcarbitol, etc.); cyclic imides (e.g. N-methylpyrrolidone, N-vinyl pyrrolidone, n-methyl oxazolidinone); aromatic amines (e.g. aniline); water-soluble heterocyclies (e.g. pyridine, morpholine, picolines, etc.); as well as mixtures of organic solvents belonging to the above described class of water-miscible liquids.

The polymers of the invention which are capable of thickening such water-miscible liquids are emulsion copolymers of vinylacetate and monoesters of unsaturated dicarboxylic acids. The monoesters of the unsaturated dicarboxylic acids used as copolymers in accordance with the present invention are generally monoesters of lower unsaturated dicarboxylic acids, specifically monoesters of such acids as: maleic, fumaric, itaconic, citraconic, mesaconic, etc. A preferred unsaturated dicarboxylic acid monoester is the monoester of maleic acid.

The ester portion of the monoester of the unsaturated dicarboxylic acid employed as a copolymer in the polymerization process of the present invention is the residue of an aliphatic cycloaliphatic, aromatic, or heterocyclic alcohol. Thus, the ester moiety of the monoester of the unsaturated dicarboxylic acid can comprise any of the following examplary radicals: aliphatic-methyl, ethyl, isopropyl, n-propyl, n-butyl, t-butyl, n-amyl, isoamyl, n-hexyl, n-heptyl, n-octyl, iso-octyl, 2-ethylhexyl, oxo-octyl, n-nonyl, oxo-nonyl, n-decyl, isodecyl, n-dodecyl, n-tridecyl, lauryl, stearyl, n-hexadecyl, n-octadecyl, eicosyl, etc.; cycloaliphatictetrahydrofurfuryl, furfuryl, etc.

Of the above, lower alkyl radicals derived from lower aliphatic alcohols are preferred.

The most highly preferred monoesters for use in the present invention are the derivatives of maleic acid of the following formula:

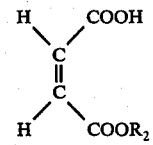

wherein $R_2$ is a substituted or unsubstituted hydrocarbon group.

Representative hydrocarbon groups for $R_2$ include the following:

(a) Alkyl groups and substituted alkyl groups of 1 to about 18 carbon atoms, either straight or branched chained, e.g. methyl, ethyl, n-propyl, isopropyl, n-butyl, isobutyl, n-pentyl, n-hexyl, nonyl, decyl, dodecyl; hydroxyalkyl, e.g. hydroxymethyl, 2-hydroxyethyl, 3-hydroxypropyl; haloalkyl, e.g. chloromethyl, 2-chloroethyl, 3-chloropropyl, etc. and the like; as well as unsaturated carbon chains such as alkenyl (e.g. ethenyl, propenyl, etc.) and alkynyl (e.g. propynyl, butynyl, etc.);

(b) Cycloaklyl groups of 3 to about 8 carbon atoms such as cyclopropyl, cyclobutyl, cyclopentyl, cyclohexyl, cycloehptyl and cyclooctyl;

(c) Aryl groups and substituted aryl groups (e.g. alkaryl) of about 6 to about 15 carbon atoms, e.g. phenyl, o-,m-and p-xylyl, tolyl, phenyl substituted by one or more alkyl groups of 1 to 7 carbon atoms, 1-naphthyl, 2-naphthyl and the like; and (d) Aralkyl groups of 6 to 15 carbon atoms such as benzyl, phenethyl and the like.

Especially preferred maleates which may be used are those where R is an alkyl group of 1 to about 10 carbon atoms, such as, for example, 2-ethylhexyl maleate, because of their ease of preparation, ready availability and properties of products produced therefrom. The invention will be described hereinafter with respect to the maleates.

The ratio of these monomers may vary widely; preferably, the vinylacetate monomer is about 80-95%, and the alkylmaleate monomer is about 5-20% by weight of the resultant copolymer.

The thickening efficiency of the copolymer varies somewhat with the number of carbon-atoms of the alkyl-group of the maleate ester monomer; optimum results are achieved when this number is five.

The emulsion polymerization of the monomers is carried out in water at temperatures between about 40° to 140° C. However, in order to avoid runaway reaction conditions, coagulation, or other undesirable side-reactions, it is preferable to conduct the polymerization at about 70°-95° C., and under an atmosphere of an inert gas, e.g. nitrogen.

The polymerization preferably is catalyzed by peroxides, such as hydrogen peroxide, benzoyl peroxide, etc., persulfates, for example, ammonium persulfate, potassium persulfate, etc., or azo-compounds, such as azo-bis-isobutyronitrile, in an amount sufficient to effect a catalytic action, preferably between about 0.05% and 2.0%, by weight of the monomers.

Solubilization of the monomers preferably is enhanced by the use of a surfactant in the reaction mixture. Preferably, the ammonium salt of the monester maleate itself is used for this purpose, in an amount equivalent to a neutralization of about 10-50% by weight of the total monester present.

The thickener composition itself is obtained by adding the emulsion copolymer, as prepared, to the water-miscible organic liquid, with agitation, at room temperature. Gelation usually sets in in about 1-2 minutes. A concentration of the copolymer in the liquid of about 0.1-10% by weight of the composition is quite suitable to effect a good thickening action; and 1-4% is preferred.

While the exact mechanism of the thickening action of the copolymers in water-miscible liquids is not known, the evidence indicates that the immobilization of the organic liquid is brought about by the penetration of the liquid into the loosely entangled polymeric meshwork. The entanglement is a consequence of the presence of units of completely different character in the copolymer, including highly hydrophilic units, for example, in the carboxylic acid moieties, as well as in their ammonium salt, and the highly hydrophobic hydrocarbon groups of the monoester. The vinylacetate units are only slightly hydrophobic, and are only slightly soluble in water. The system thus swells in water, causing the hydrophobic entities to curl up and extend the hydrophilic units. The presence of water therefore is essential to the formation of the gel. In its absence, penetration of the hydrophilic organic liquid is limited, and although the polymer becomes swollen, the organic liquid does not gel.

The thickener compositions of this invention are useful in a variety of applications. They are compatible with ingredients of deodorants, antiperspirants, ointments, creams, foams, lotions, etc., which makes them useful in the cosmetic field as well as in pharmaceutical application. They are eminently suitable for the preparation of gelled fuels. The compounds of this invention also diminish the evaporation of water-miscible organic solvents, thus making them useful as lacquer, paint, and varnish removers.

The following specific examples, which are merely illustrative, will demonstrate the actual preparation of some of the useful copolymers of the invention and their utilization in the preparation of novel thickener compositions.

PREPARATION OF THE EMULSION COPOLYMER

EXAMPLE 1

500 g of distilled water is placed in a 2-1 resin kettle equipped with a mechanical stirrer, reflux condenser, gas inlet tube, thermometer and graduated dropping funnel, and 39 g of the n-pentyl monoester of maleic acid and 10 g, of conc. ammonia is added. After stirring for 5 minutes, 50 g of vinylacetate and 4.7 g of ammonium persulfate are added to the mixture and the system is purged thoroughly with nitrogen. The contents of the kettle then are heated to gentle reflux, and addition of 410 g of vinylactate is begun. The vinylacetate is added during two hours while maintaining gentle reflux. After 178 of the vinylacetate has been added, 200 g of distilled water is introduced. An additional 200 g of distilled water is added ½ hour after the completion of the monomer addition. Agitation is continued for an additional hour, during which time refluxing of the monomer subsides. Finally, the contents of the kettle are cooled and the product — a heavy emulsion — is discharged.

EXAMPLE 2

545 g of distilled water is placed in the kettle described in Example 1, then successively 34 g of vinylacetate, 6 g of the monoethyl ester of maleic acid, 40 g of Rohm and Haas Triton X-200 (sodium salt of alkylaryl polyether sulfonate) (28%) and 10 g GAF Igepal CO-630 (ethoxylated alkylphenol) surfactants, 10 g sodium hydrogen carbonate and finally 0.5 g ammonium persulfate are added. The system is purged thoroughly with nitrogen, then heated to gentle reflux with the help of a water bath. At the reflux temperature 306 g vinylacetate is added during a period of two hours. The unreacted monomer is consumed by the addition of 1.0 g of a 10% ammonium persulfate solution. When refluxing ends, the mixture is cooled and discharged.

PREPARATION OF THE THICKENER COMPOSITIONS

EXAMPLE 3

20 g of each of the following solvent liquids is placed in a beaker and the emulsion copolymer of Example 1 is added dropwise while the mixture is stirred vigorously. The solvent starts to thicken after the addition of only a few drope of the copolymer. The addition of the copolymer is stopped when the system turns to a firm gel. The amount of the copolymer necessary to make the solvent gel then is determined, and the results are as follows:

| SOLVENT LIQUID | AMOUNT OF COPOLYMER g (34%) | CHARACTERISTICS OF THE THICKENER COMPOSITION | | |
|---|---|---|---|---|
| Methanol | 2 | smooth, | firm, | clear |
| Ethanol | 2 | " | " | cloudy |
| Isopropanol | 3 | " | " | cloudy |
| Butyrolactone | 2 | " | " | cloudy |
| B-pivalolactone | 3 | " | " | cloudy |
| N-methylpyrrolidone | 4 | " | " | clear |
| N-vinyl pyrrolidone | 3 | " | " | clear |
| Dimethyl formamide | 2 | " | " | clear |
| Pyridine | 3 | " | " | clear |
| B-picoline | 2 | " | " | clear |
| Acetone | 3 | " | " | cloudy |
| Methylethyl ketone | 3 | " | " | clear |
| Acetaldehyde | 4 | gritty | " | clear |
| Aniline | 3 | " | " | cloudy |
| Methylcellosolve | 2 | smooth | " | clear |
| Methylcarbitol | 3 | " | " | cloudy |
| Morpholine | 3 | " | " | clear |

In general, the gels are observed to thin out upon heating to 65°-70° C., or higher, but resolidify when cooled to room temperature.

While the invention has been described with particular reference to certain embodiments thereof, it will be understood by those skilled in the art that possible modifications and substitutions may be made which are within the skill of the art and those changes are considered within the spirit and scope of this invention.

What is claimed is:

1. A thickened composition consisting essentially of:
   (a) a water-based emulsion copolymer of vinyl acetate monomer and a monoester of an unsaturated dicarboxylic acid monomer,
   (b) water, and
   (c) a water-miscible organic liquid.

2. A thickened composition according to claim 1 wherein said unsaturated dicarboxylic acid is maleic acid.

3. A thickened composition according to claim 1 wherein said vinylacetate is about 80-95%, and said monoester of said unsaturated dicarboxylic acid is about 5-20% by weight of said copolymer.

4. A thickened composition according to claim 1 wherein the number of carbon-atoms of the alkyl-group of said monoester is five.

5. A thickened composition according to claim 1 wherein said monester of an unsaturated dicarboxylic acid is present partially in the form of the ammonium salt thereof.

6. A thickened composition according to claim 5 wherein said ammonium salt constitutes about 10-50% of the total amount of the monoester present.

7. A thickened composition according to claim 1 wherein said copolymer is present in the liquid in a concentration of about 0.10-10% by weight of the composition.

8. A thickened composition according to claim 7 wherein said copolymer concentration is about 1-4%.

9. A thickened composition according to claim 1 wherein said liquid is selected from the group consisting of methanol, butyrolactone, isopropanol, n-vinyl pyrrolidone, pyridine, acetone, acetaldehyde, methylcellosolve, morpholine, ethanol, b-pivaloactone, n-methylpyrrolidone, dimethyl formamide, b-picoline, methylethyl ketone, aniline, and methylcarbitol.

10. A method of making a thickened composition which comprises:
    (a) forming at a temperature of 40°–140° C. a water emulsion copolymer of vinylacetate monomer and a monoester of an unsaturated dicarboxylic acid monomer, and,
    (b) adding it to a water-miscible organic liquid.

11. A method according to claim 10 wherein said unsaturated, dicarboxylic acid is maleic acid.

12. A method according to claim 11 wherein said vinylacetate is about 80-95%, and said monoester of maleic acid is about 5-20% by weight of the copolymer, and said copolymer is present in said liquid in a concentration of about 0.1-10% by weight of said composition.

13. A method according to claim 12 wherein said monoester of maleic acid is present in the form of its ammonium salt in a concentration of about 10-50% of the monoester.

14. A method according to claim 10 wherein said temperature is 70°–95° C.

* * * * *